(12) United States Patent
Fukuda

(10) Patent No.: US 11,999,085 B2
(45) Date of Patent: Jun. 4, 2024

(54) INJECTION MOLDING MACHINE

(71) Applicant: THE JAPAN STEEL WORKS, LTD., Tokyo (JP)

(72) Inventor: Keigo Fukuda, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 17/747,985

(22) Filed: May 18, 2022

(65) Prior Publication Data

US 2022/0379530 A1    Dec. 1, 2022

(30) Foreign Application Priority Data

May 31, 2021   (JP) ................................ 2021-091132

(51) Int. Cl.
| | | |
|---|---|---|
| *B29C 45/04* | (2006.01) | |
| *B29C 45/17* | (2006.01) | |
| *B29C 45/40* | (2006.01) | |
| *B29C 45/50* | (2006.01) | |
| *B29C 45/66* | (2006.01) | |

(52) U.S. Cl.
CPC ...... *B29C 45/0416* (2013.01); *B29C 45/4005* (2013.01); *B29C 45/5008* (2013.01); *B29C 45/661* (2013.01); *B29C 2045/1793* (2013.01); *B29C 2045/4036* (2013.01); *B29C 2045/5064* (2013.01)

(58) Field of Classification Search
CPC .... B29C 2045/1793; B29C 2045/1792; B29C 45/0416
See application file for complete search history.

(56) References Cited

U.S. PATENT DOCUMENTS 5,532,533 A     7/1996  Mizutani
2012/0009297 A1*  1/2012  Ochi ................... B29C 45/7666
                                                425/556

(Continued)

FOREIGN PATENT DOCUMENTS

DE      4411152 A1   10/1994
DE      19846960 A1   4/2000

(Continued)

OTHER PUBLICATIONS

Office Action issued Mar. 22, 2024, in Austrian Patent Application No. A50375/2022.

*Primary Examiner* — Arrie L Reuther
*Assistant Examiner* — Virak Nguon
(74) *Attorney, Agent, or Firm* — Potomac Law Group, PLLC

(57) ABSTRACT

An injection molding machine includes: a fixed side member; and a movable side member fixed to the fixed side member, the movable side member being driven by a motor in order to perform injection molding of a molded product. The injection molding machine further includes a power feeding apparatus, one or more motors, and at least one servo amplifier. The power feeding apparatus converts a three-phase AC voltage into a DC voltage. The one or more of the motors are provided in the movable side member and drive the movable side member. The at least one servo amplifier is provided in the movable side member and drives one of the one or more of the motors by the DC voltage being supplied thereto through a DC power supply line.

12 Claims, 14 Drawing Sheets

(56) References Cited

U.S. PATENT DOCUMENTS

| | | | |
|---|---|---|---|
| 2012/0227242 A1* | 9/2012 | Wenzin | B29C 45/1761 29/428 |
| 2020/0361129 A1* | 11/2020 | Ochiiwa | H02K 7/14 |

FOREIGN PATENT DOCUMENTS

| | | | | |
|---|---|---|---|---|
| EP | 993913 A1 | * | 4/2000 | B25J 19/00 |
| EP | 2106015 A2 | | 9/2009 | |
| EP | 2416478 A2 | | 2/2012 | |
| JP | 2007-216285 A | | 8/2007 | |
| JP | 2013-202800 A | | 10/2013 | |
| JP | 2013202800 A | * | 10/2013 | |
| JP | 2017-217836 A | | 12/2017 | |
| JP | 2017217836 A | * | 12/2017 | |
| JP | 2019-147344 A | | 9/2019 | |

\* cited by examiner

INJECTION MOLDING MACHINE

INCORPORATION BY REFERENCE

This application is based upon and claims the benefit of priority from Japanese patent application No. 2021-91132, filed on May 31, 2021, the disclosure of which is incorporated herein in its entirety by reference.

BACKGROUND

The present disclosure relates to an injection molding machine.

In an injection molding machine, an injection apparatus and a mold clamping apparatus are generally provided over a base (a bed) thereof. In the injection apparatus, a screw is inserted into a heating cylinder, and the screw is driven in a rotational direction and an axial direction inside the heating cylinder, whereby a material is measured and plasticized, and then injected. In an electric injection molding machine, a screw is rotated by a plasticization motor and driven in the axial direction by an injection motor. In the mold clamping apparatus, a mechanism for opening and closing a mold is driven by a mold clamping motor, and an ejector mechanism for removing a molded product from the mold is driven by an ejector motor (Japanese Unexamined Patent Application Publication No. 2013-202800).

A three-phase AC voltage is supplied to the injection molding machine from a factory power supply, and is converted into a DC voltage by a converter (i.e., an AC/DC converter) provided in the injection molding machine. The DC voltage is supplied to servo amplifiers that drive motors, and a current is supplied to each motor from the servo amplifier connected thereto (Japanese Unexamined Patent Application Publication No. 2017-217836).

The above converter and servo amplifiers are mounted inside a base on which movable parts such as the injection apparatus and the mold clamping apparatus are placed (Japanese Unexamined Patent Application Publication No. 2019-147344). The servo amplifier and the motor that are provided in the movable parts are connected to each other by a cable composed of a power supply line, a communication line, and the like.

SUMMARY

However, in the above-described injection molding machine, the servo amplifier and the motor are connected to each other by a relatively long three-phase AC power supply line. Therefore, it is conceivable that noises may be radiated from the three-phase AC power supply line when the motor is driven. Further, when the three-phase AC power supply line is relatively long, there is a possibility that noises radiated from noise sources other than the three-phase AC power supply line may be superimposed on the three-phase AC power supply line and affect the driving state of the motor. Therefore, it is necessary to take measures to improve resistance against noises being radiated in the wiring connecting the servo amplifier to the motor.

Other challenges and novel features will become apparent from the description herein and the accompanying drawings.

In an embodiment, an injection molding machine is an injection molding machine including: a fixed side member; and a movable side member fixed to the fixed side member, the injection molding machine further including: a power feeding apparatus; one or more motors configured to drive the movable side member, the one or more of the motors being provided in the movable side member; and at least one servo amplifier configured to drive one of the one or more of the motors by a DC voltage being supplied thereto, the at least one servo amplifier being provided in the movable side member.

According to an embodiment, it is possible to improve the noise resistance of an injection molding machine The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
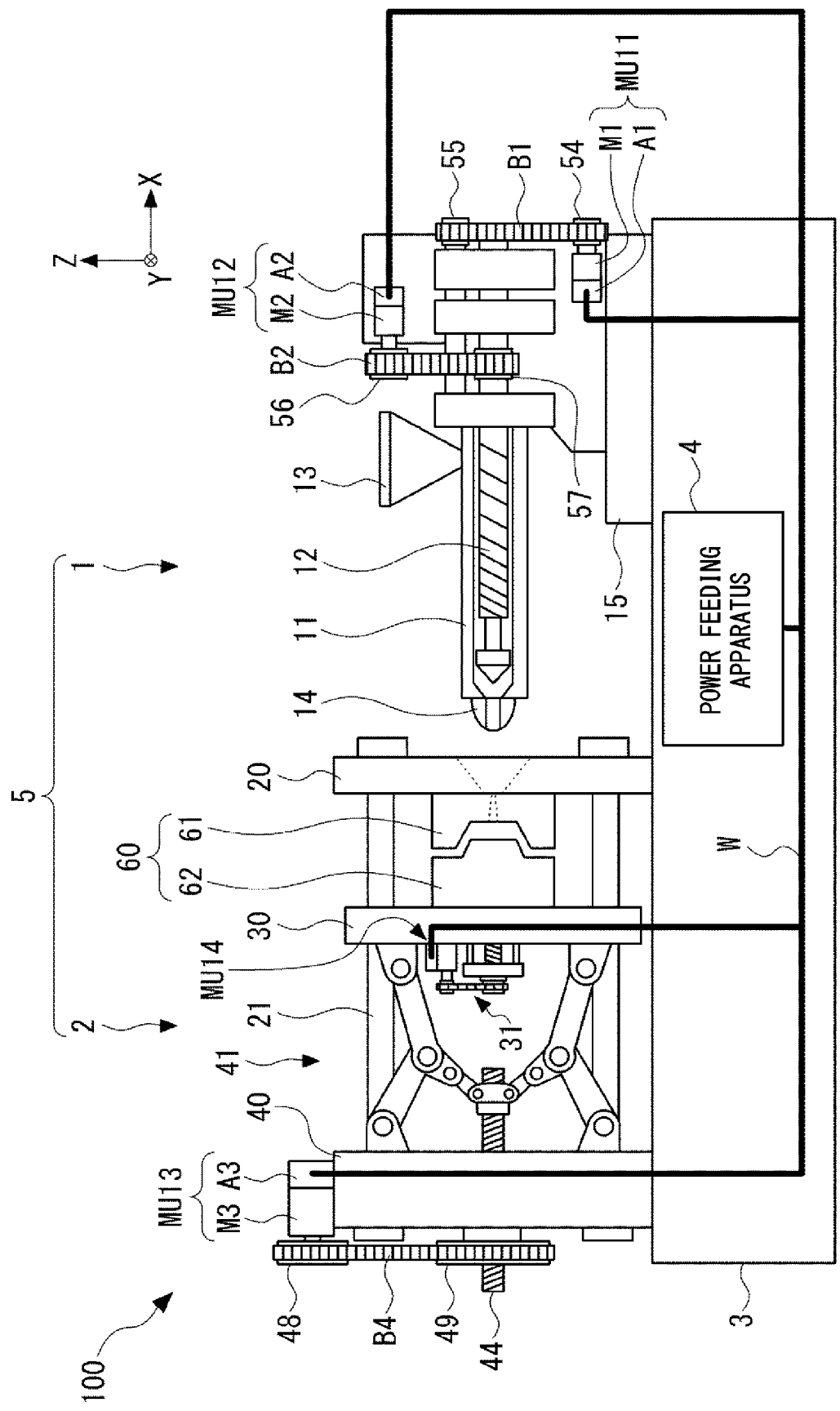
FIG. 1 is a side view schematically showing a configuration of an injection molding machine according to a first embodiment.

Hereinafter, specific embodiments of the present disclosure will be described with reference to the drawings. However, the present disclosure is not limited to the following embodiments. In order to clarify the description, the following description and drawings are appropriately simplified. In addition, the same elements are denoted by the same reference numerals, and the redundant description will be omitted.

First Embodiment

The embodiments according to the present disclosure will be described hereinafter with reference to the drawings. FIG. 1 is a side view schematically showing a configuration of an injection molding machine 100 according to a first embodiment. The injection molding machine 100 includes a bed 3, and an injection apparatus 1 and a mold clamping apparatus 2 mounted over the bed 3. A power feeding apparatus 4 for feeding power to a motor for driving the injection apparatus 1 and the mold clamping apparatus 2 is provided inside the bed 3.

The bed 3 is placed, for example, on a floor surface, and is configured as a fixed side member for fixing the injection apparatus 1 and the mold clamping apparatus 2. As described later, the injection apparatus 1 and the mold clamping apparatus 2 form a movable side member 5 which is fixed to the bed 3, i.e., the fixed side member in order to enable injection molding of a molded product to be performed and driven by a motor.

The injection apparatus 1 is attached to a base 15 provided over the bed 3, and is configured as an apparatus that plasticizes resin pellets charged into a heating barrel 11 from a hopper 13 and injects the plasticized resin into a mold. A screw 12 inserted into the heating barrel 11 is retracted in the axial direction (the +X direction, i.e., a direction opposite to an injection direction) while being rotated, whereby the resin pellets charged into the heating barrel 11 are plasticized (melted). After that, the screw 12 is advanced in the axial direction (the −X direction, i.e., the injection direction) while being rotated, whereby the plasticized material is injected into a mold 60. The screw 12 is driven in the axial direction by a servomotor M1 for injection, and driven in the rotational direction by a servomotor M2 for plasticization.

The servomotor M1 for injection is mounted on the injection apparatus 1 as an injection motor unit MU11 together with a servo amplifier A1 for injection. The servomotor M1 is fixed to the base 15 so that the axial direction (the X direction) becomes a rotation axis. In this example, the servomotor M1 is fixed to the base 15 so that a rotation shaft of the servomotor M1 projects in a direction (the +X direction) opposite to the injection direction. The servo amplifier A1 is attached to the base 15 at a position adjacent to the servomotor M1 in the injection direction (the −X direction). The servo amplifier A1 converts a DC voltage supplied from the power feeding apparatus 4 into a three-phase AC voltage of a predetermined frequency and voltage by an inverter, and supplies it to the servomotor M1.

The servomotor M2 for plasticization is mounted on the injection apparatus 1 as a plasticization motor unit MU12 together with a servo amplifier A2 for plasticization. The servomotor M2 is fixed to the base 15 so that the axial direction (the X direction) becomes a rotation axis. In this example, the servomotor M2 is fixed to the base 15 so that a rotation shaft of the servomotor M2 projects in the injection direction (the −X direction). The servo amplifier A2 is attached to the base 15 at a position adjacent to the servomotor M2 in a direction (the +X direction) opposite to the injection direction. The servo amplifier A2 converts a DC voltage supplied from the power feeding apparatus 4 into a three-phase AC voltage of a predetermined frequency and voltage by an inverter, and supplies it to the servomotor M2.

Figure 2:
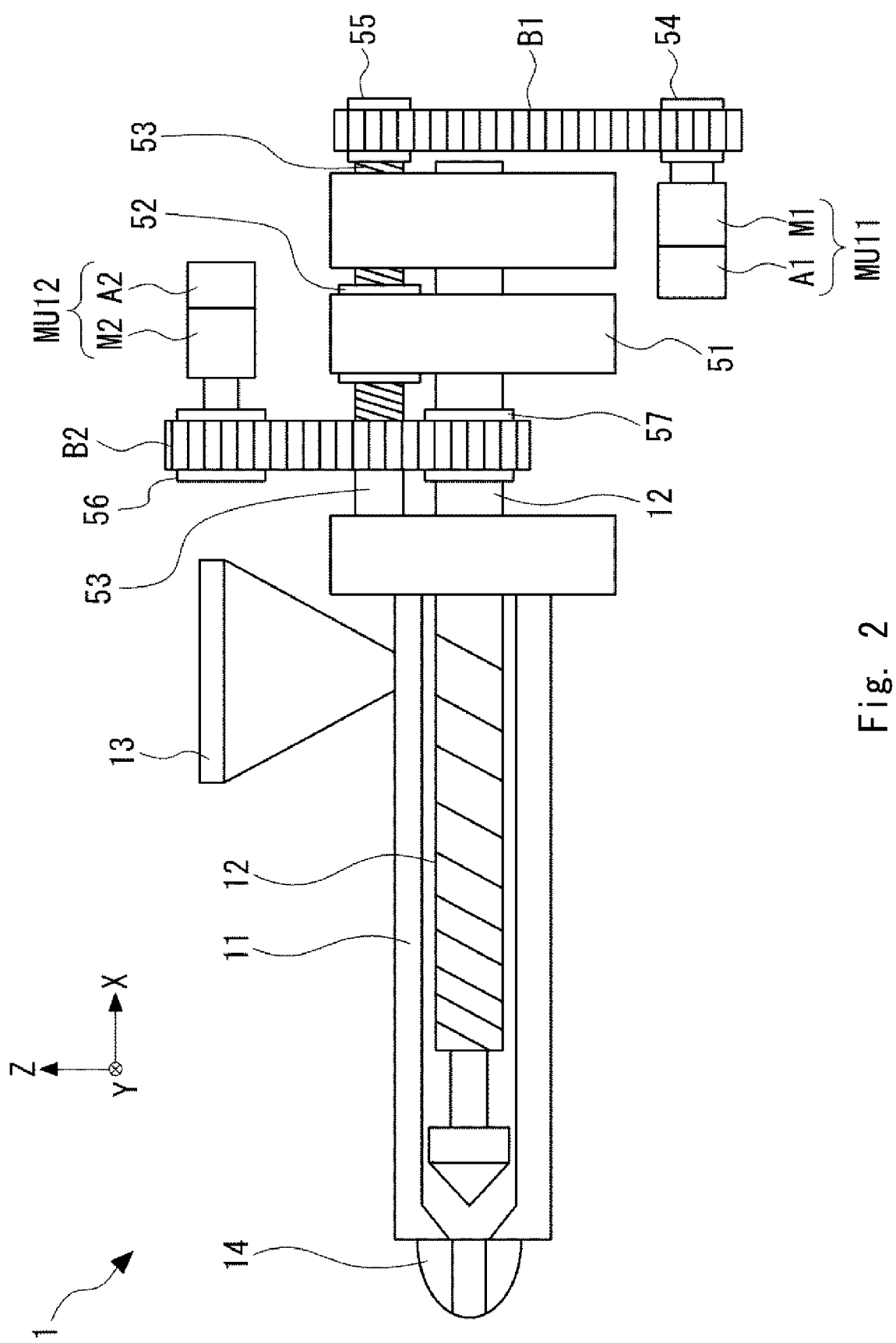
FIG. 2 is an enlarged view of a main part of an injection apparatus according to the first embodiment.

A mechanism for driving the screw 12 in the axial direction (the X direction) will be described. FIG. 2 is an enlarged view of a main part of the injection apparatus 1 according to the first embodiment. A tail part of the screw 12 (an end part of the screw 12 in the +X direction) is borne by an intermediate plate 51 having the Y-Z plane as a main surface so that it is rotatable and is restricted from moving in the axial direction (the X direction). A ball nut 52 is fixed to an upper part of the intermediate plate 51, and a ball screw 53 is screwed into the ball nut 52. A pulley 55 is firmly fixed to an end part of the ball screw 53 in the +X direction, and a pulley 54 is firmly fixed to the rotation shaft of the servomotor M1. A belt B1 is stretched between the pulley 54 and the pulley 55, and a rotation force of the pulley 54 is transmitted to the pulley 55 by the belt B1, whereby the ball screw 53 can be rotated.

With the above configuration, the ball screw 53 is rotated and hence the intermediate plate 51 to which the ball nut 52 is fixed is driven in the axial direction (the X direction), whereby the screw is driven in the axial direction (the X direction) in conjunction with the driving of the intermediate plate 51. By driving the intermediate plate 51 in the injection direction (the −X direction), the molten material can be injected into the mold from a nozzle 14. By driving the intermediate plate 51 in a direction (the +X direction) opposite to the injection direction, for example, the material can be charged into the heating barrel 11.

Next, a mechanism for driving the screw 12 in the rotational direction will be described. A shaft of the screw 12 exposed from the heating barrel 11 toward the intermediate plate 51 is inserted into a pulley 57, and the pulley 57 is firmly fixed to the screw 12. A pulley 56 is firmly fixed to the rotation shaft of the servomotor M2. A belt B2 is stretched between the pulley 56 and the pulley 57, and a rotation force of the pulley 56 is transmitted to the pulley 57 by the belt B2, whereby the screw 12 can be rotated.

The base 15 is configured so that it can be driven in the axial direction by a servomotor (not shown). By this configuration, it is possible to move the injection apparatus 1 in a direction along the X axis, that is, in a direction in which the injection apparatus 1 moves closer to the mold clamping apparatus 2 and in a direction in which the injection apparatus 1 moves away from the mold clamping apparatus 2. The aforementioned servomotor and a mechanism for transmitting a driving force of the servomotor to the base 15 are not shown for the sake of simplification of the drawing.

The mold clamping apparatus 2 is an apparatus that clamps the mold 60 of a molded product, and includes a servomotor M3 used for the mold clamping and a servomotor M4 for ejecting the molded product from the mold. The mold clamping apparatus 2 drives the servomotor M3 for mold clamping, to thereby, for example, clamp a mold in the X direction, which mold is separated into two parts in the axial direction (the X direction), and fix it. Further, regarding the molded product molded by injecting resin into the mold, by driving the servomotor M4 for ejection, an ejector pin that can be driven in the axial direction is brought into contact with the molded product, to thereby, for example, eject the molded product in the +X direction. The configuration and the operations of the mold clamping apparatus 2 will be specifically described below.

Figure 3:
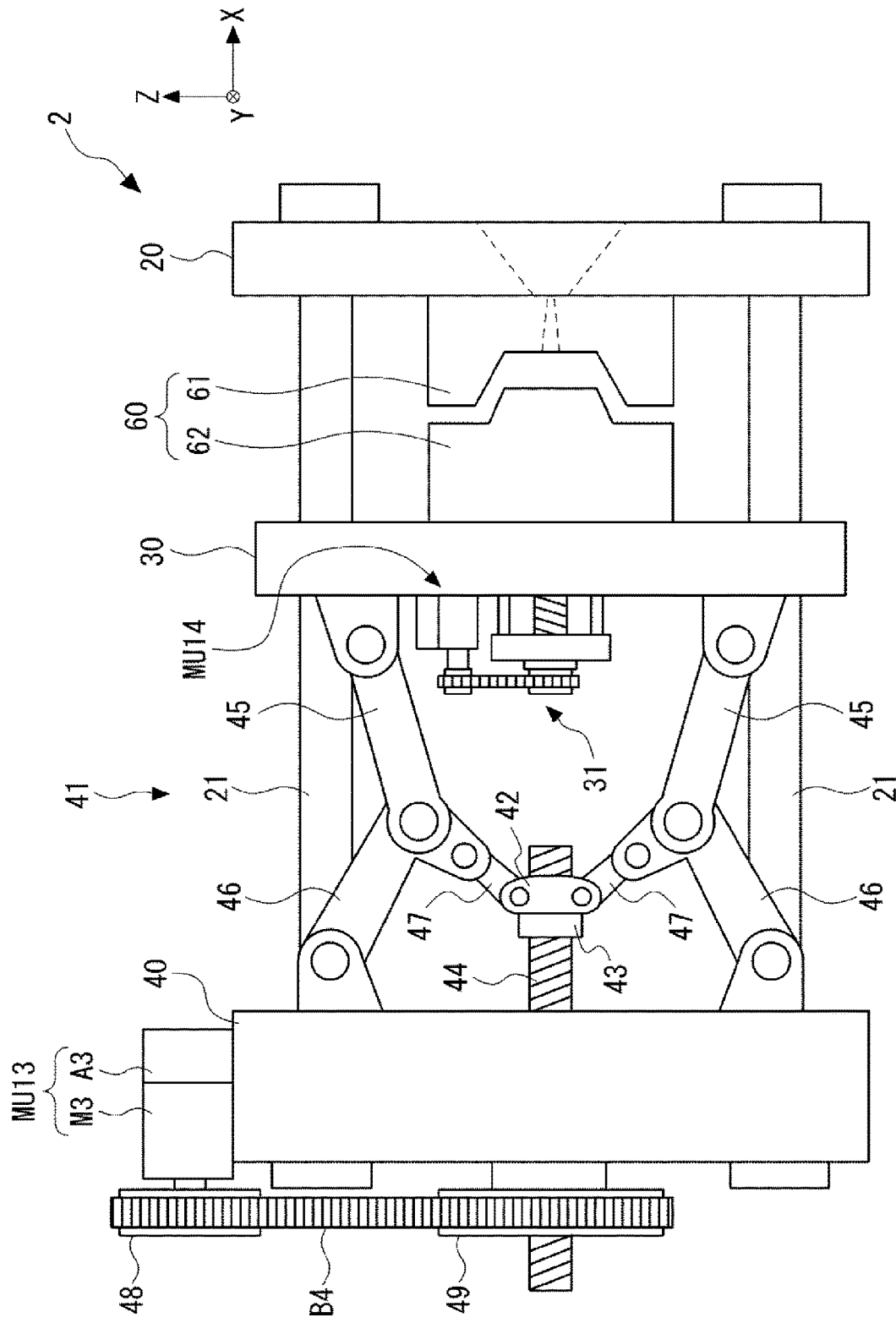
FIG. 3 is a diagram schematically showing a configuration of a toggle mechanism of a mold clamping apparatus according to the first embodiment.

The mold clamping apparatus 2 is configured as a toggle-type mold clamping apparatus. FIG. 3 schematically shows a configuration of a toggle mechanism 41 of the mold clamping apparatus 2 according to the first embodiment. In the mold clamping apparatus 2, a fixed platen 20, a movable platen 30, and a mold clamping housing 40, which are plate-like members having the Y-Z plane as a main surface, are arranged in the axial direction (the X direction) so that they are separated from one another. The fixed platen 20 is configured so as to hold a fixed side mold 61, while the movable platen 30 is configured so as to hold a movable side mold 62.

A plurality of tie bars 21 passing through the movable platen 30 are provided between the fixed platen 20 and the mold clamping housing 40. In this example, four of the tie bars 21 connect the fixed platen 20 to the mold clamping housing 40. Four through holes passing through the fixed platen 20 in the axial direction (the X direction) are provided respectively in the vicinities of four corners of the fixed platen 20, and the end parts of the four tie bars 21 on the fixed platen 20 side are inserted respectively into these four through holes and fixed. Four through holes passing through the mold clamping housing 40 in the axial direction (the X direction) are provided in the vicinities of four corners of the mold clamping housing 40, and the end parts of the four tie bars 21 on the mold clamping housing 40 side are inserted respectively into these four through holes and fixed. Four through holes passing through the movable platen 30 in the axial direction (the X direction) are provided in the vicinities of the four corners of the movable platen 30, and the four tie bars 21 are inserted respectively into these four through holes. However, the four tie bars 21 are not fixed to the movable platen 30, and the movable platen 30 can slide in the axial direction (the X direction) relative to the four tie bars 21.

The movable platen 30 is connected to the mold clamping housing 40 by the toggle mechanism 41. The toggle mechanism 41 can be configured as a general toggle mechanism, and has a configuration described below in this example. The toggle mechanism 41 includes a crosshead 42, a ball nut 43, a ball screw 44, a pair of first links 45, a pair of second links 46, and a pair of third links 47.

The crosshead 42 that drives the toggle mechanism 41 is fixed to the ball nut 43, and the ball screw 44 is screwed into the ball nut 43. The ball screw 44 is borne by the mold clamping housing 40 so that it is rotatable and is restricted from moving in the axial direction (the X direction).

The first link 45 is configured as a rod-like member composed of a flat plate member having the Z-X plane as a main surface. The second link 46 is configured as a roughly L-shaped member composed of a flat plate member having the Z-X plane as a main surface. The third link 47 is configured as a relatively short rod-like member composed of a flat plate member having the Z-X plane as a main surface. One end of the first link 45 is pin-coupled to the movable platen 30. The second link 46 is disposed so that an acute angle formed by an L-shaped bending part thereof is directed toward the movable platen 30, and the other end of the first link 45 is pin-coupled to the L-shaped bending part of the second link 46. One end of the second link 46 is pin-coupled to the mold clamping housing 40, and the other end thereof is pin-coupled to one end of the third link 47. The other end of the third link 47 is pin-coupled to the crosshead 42. As is obvious from FIG. 3, the term "pin coupling" herein means to rotatably couple two members to each other by means of a pin of which the axis is the direction (the Y direction) normal to the main surface (Z-X) of each of the first to the third links 45 to 47.

The servomotor M3 for mold clamping is mounted on the mold clamping apparatus 2 as a mold clamping motor unit MU13 together with a servo amplifier A3 for mold clamping. The servomotor M3 is mounted over the mold clamping housing 40. In this example, the servomotor M3 is fixed to the mold clamping housing 40 so that a rotation shaft of the servomotor M3 projects in the injection direction (the −X direction). The servo amplifier A3 is attached to the mold clamping housing 40 at a position adjacent to the servomotor M3 in a direction (the +X direction) opposite to the injection direction. The servo amplifier A3 converts a DC voltage supplied from the power feeding apparatus 4 into a three-phase AC voltage of a predetermined frequency and voltage by an inverter, and supplies it to the servomotor M3.

A pulley 48 is firmly fixed to the rotation shaft of the servomotor M3, and a pulley 49 is firmly fixed to the ball screw 44. A belt B3 is stretched between the pulley 48 and the pulley 49, and a rotation force of the pulley 48 is transmitted to the pulley 49 by the belt B3, whereby the ball screw 44 can be rotated.

With the above configuration, in the mold clamping apparatus 2, the ball screw 44 is rotated and hence the ball nut 43 is driven in the axial direction (the X direction), whereby the crosshead 42 is driven in the axial direction (the X direction) in conjunction with the driving of the ball nut 43. As a result, the toggle mechanism 41 is driven. When the crosshead 42 is driven in a direction in which the crosshead 42 moves closer to the mold clamping housing 40 (the −X direction), the toggle mechanism 41 is driven so as to bring the movable platen 30 close to the mold clamping housing 40. By this configuration, it is possible to separate the movable side mold 62 held by the movable platen 30 from the fixed side mold 61 held by the fixed platen 20. When the crosshead 42 is driven in a direction in which the crosshead 42 moves away from the mold clamping housing 40 (the +X direction), the toggle mechanism 41 is driven so as to move the movable platen 30 away from the mold clamping housing 40. By this configuration, it is possible to join the fixed side mold 61 held by the fixed platen 20 and the movable side mold 62 held by the movable platen 30.

Figure 4:
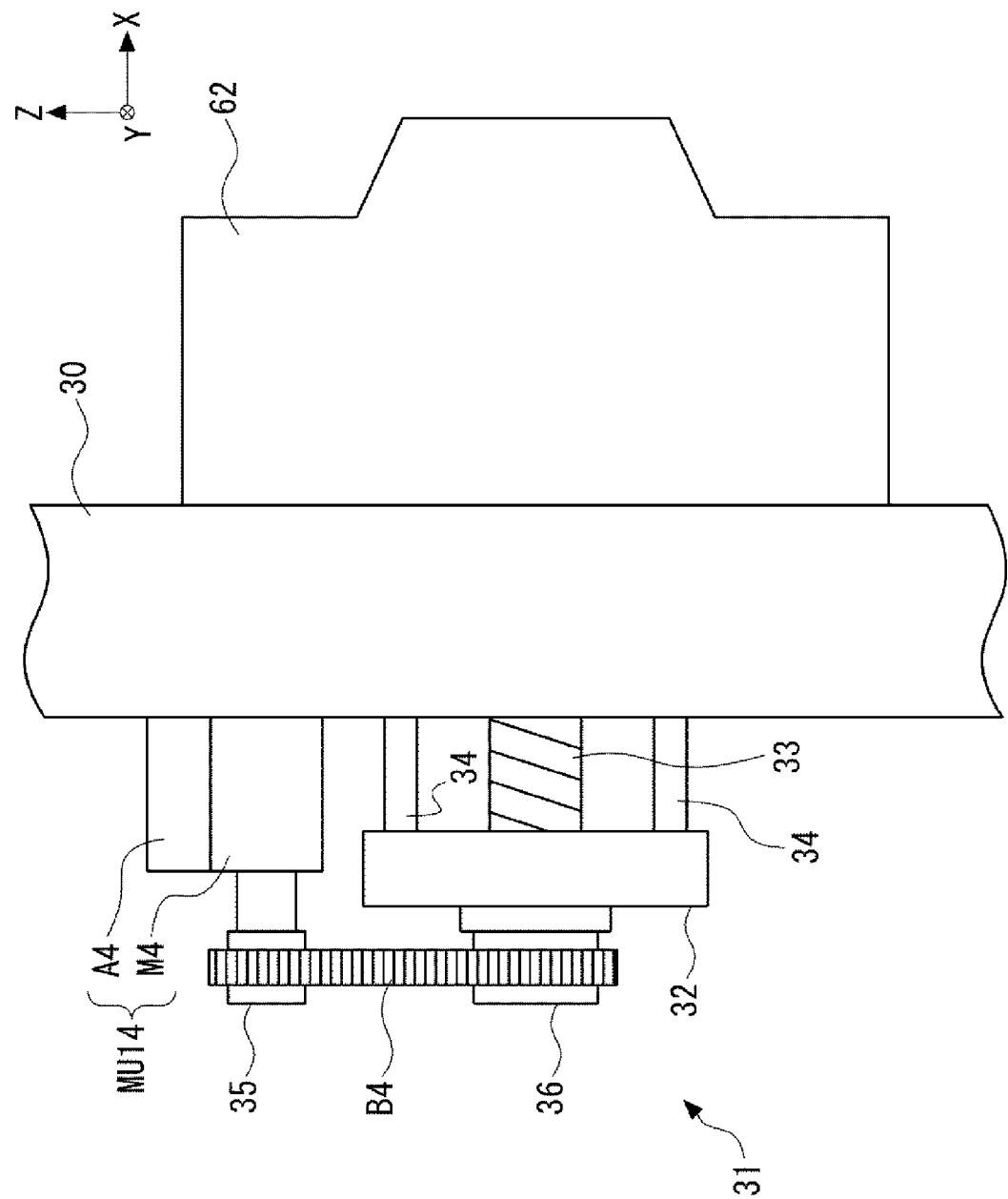
FIG. 4 is a diagram schematically showing a configuration of an ejector mechanism according to the first embodiment.

An ejector mechanism for removing a molded product from a mold is provided in the movable platen 30. FIG. 4 schematically shows a configuration of an ejector mechanism 31 according to the first embodiment. The ejector mechanism 31 includes an ejector plate 32, a ball screw 33 and ejector pins 34.

The ball screw 33 projects from the movable platen 30 in a direction (the −X direction) in which the ball screw 33 faces the mold clamping housing 40, and is borne by the movable platen 30 so that one end thereof is rotatable and is restricted from moving in the axial direction (the X direction). A projected screw part of the ball screw 33 is screwed into a central part of the ejector plate 32, which is a plate-like member having the Y-Z plane as a main surface. A plurality of ejector pins 34 are extended from the ejector plate 32 in a direction (the +X direction) in which the ejector pin 34 faces the movable platen 30. Through holes into which the plurality of ejector pins can be inserted are provided in the movable platen 30 and the movable side mold 62.

The servomotor M4 for ejection is mounted on the mold clamping apparatus 2 as an ejector motor unit MU14 together with a servo amplifier A4 for ejection. The servomotor M4 is fixed to the movable platen 30 so that a rotation shaft of the servomotor M4 projects in the injection direction (the −X direction). The servo amplifier A4 is attached to the movable platen 30 at a position adjacent to and above (in the +Y direction) the servomotor M4. The servo amplifier A4 converts a DC voltage supplied from the power feeding apparatus 4 into a three-phase AC voltage of a predetermined frequency and voltage by an inverter, and supplies it to the servomotor M4.

A pulley 35 is firmly fixed to the rotation shaft of the servomotor M4, and a pulley 36 is firmly fixed to the other end of the ball screw 33. A belt B4 is stretched between the pulley 35 and the pulley 36, and a rotation force of the pulley 35 is transmitted to the pulley 36 by the belt B4, whereby the ball screw 33 can be rotated.

With the above configuration, in the ejector mechanism 31, the ball screw 33 is rotated and hence the ejector plate 32 is driven in the axial direction (the X direction), whereby the plurality of the ejector pins 34 are driven in the axial direction (the X direction) in conjunction with the driving of the ejector plate 32. When the ejector plate 32 is driven in a direction in which the ejector plate 32 moves closer to the movable platen 30 (the +X direction), the ejector pins 34 are driven in a direction in which the ejector pins 34 are inserted into the respective through holes provided in the movable platen 30 and the movable side mold 62 (the +X direction). By this configuration, the ejector pins 34 are driven and hence project from a surface of the movable side mold 62 on the molded product side, whereby it is possible to remove the molded product from the movable side mold 62. When the ejector plate 32 is driven in a direction in which the ejector plate 32 moves away from the movable platen 30 (the −X direction), the ejector pins 34 are driven in a direction in which they are pulled out from the respective through holes provided in the movable platen 30 and the movable side mold 62 (the −X direction). Thus, the ejector pins 34 can be accommodated in the respective through holes.

Next, a power supply system of the injection molding machine 100 will be described. As described above, in the injection molding machine 100, a measuring process in which resin is melted and then measured, an injection process in which resin is injected, and the like are executed. Although the servomotor M2 that drives the screw 12 in the rotational direction in the measuring process consumes power for a long time, the magnitude of instantaneous power is relatively small. In contrast, the servomotor M1 that drives the screw 12 in the axial direction in the injection process consumes a large amount of power although the driving time thereof is short. That is, the power consumed by the injection molding machine 100 greatly varies depending on the process. Therefore, the power feeding apparatus 4 that feeds power to a motor of the injection molding machine 100 is configured so as to have a capacity that can cope with the maximum power consumed.

Figure 5:
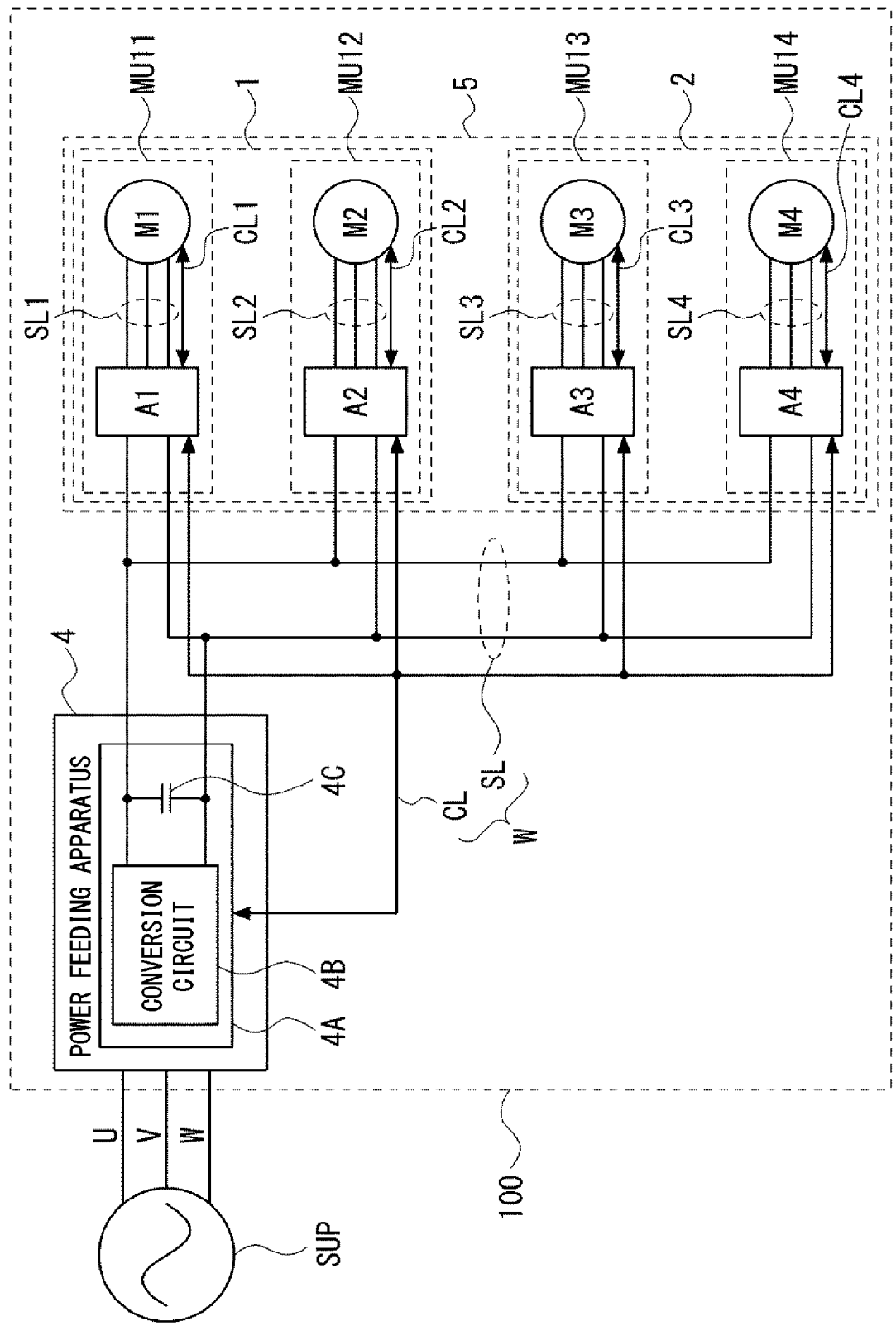
FIG. 5 is a diagram showing a power supply system of the injection molding machine according to the first embodiment.

FIG. 5 shows the power supply system of the injection molding machine 100 according to the first embodiment. A three-phase AC voltage is supplied from a three-phase AC power supply SUP to the injection molding machine 100. The three-phase AC voltage is converted into a DC voltage by the power feeding apparatus 4. A converter 4A is provided in the power feeding apparatus 4, and the converter 4A converts the supplied three-phase AC voltage into a DC voltage. A capacitor 4C configured so as to be chargeable by a DC voltage is provided in a DC power supply line SL composed of two power supply lines for supplying a DC voltage. In this example, the capacitor 4C is configured as a capacitor connected between the two power supply lines of the DC power supply line SL. By this configuration, it is possible to prevent fluctuations in the DC voltage due to the effects of, for example, the fluctuations in the three-phase AC voltage and the conversion operation performed by the converter 4A. It is needless to say that the capacitor 4C can prevent the fluctuations in the DC voltage due to the load fluctuation of a motor or the like.

The DC voltages output from the power feeding apparatus 4 are supplied by the DC power supply line SL to the servo amplifiers A1 and A2 mounted on the injection apparatus 1 and the servo amplifiers A3 and A4 mounted on the mold clamping apparatus 2. Note that the power feeding apparatus 4 is connected to each of the servo amplifiers A1 to A4 by a communication line CL for exchanging signals for controlling operations performed by the injection molding machine 100.

The DC voltages supplied through the DC power supply line SL are converted into three-phase AC voltages and amplified by the servo amplifiers A1 to A4, and these voltages are output to the servomotors M1 to M4 through three-phase AC power supply lines SL1 to SL4, respectively. Note that the servo amplifiers A1 to A4 are connected to the respective servomotors M1 to M4 through communication lines CL1 to CL4 in order to transmit signals to be transmitted through the communication line CL.

Figure 6:
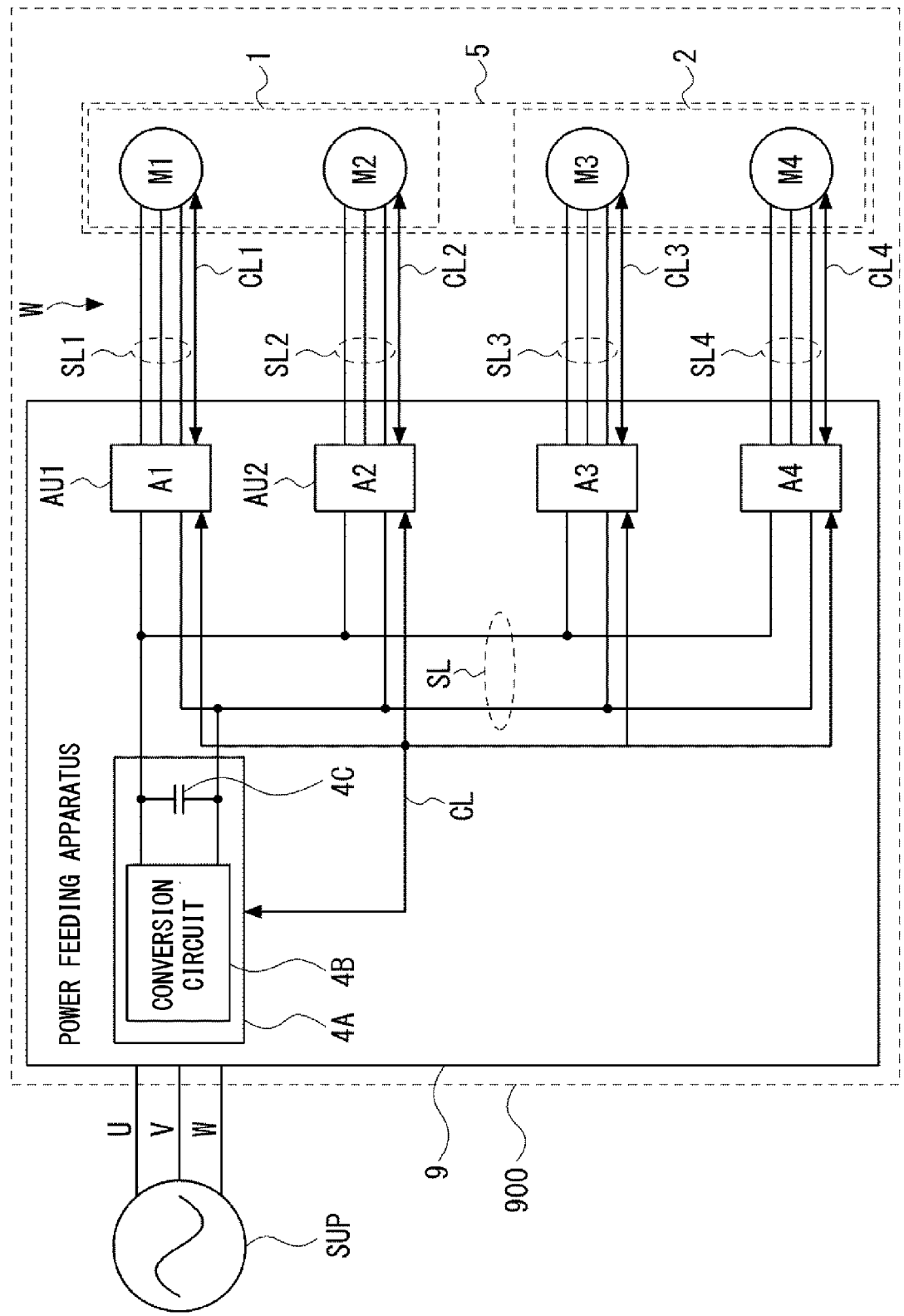
FIG. 6 is a diagram showing a power supply system of a general injection molding machine.

Next, a power supply system of a general injection molding machine 900 will be described in order to make it easier to understand advantages of the configuration of the injection molding machine 100. FIG. 6 shows the power supply system of the general injection molding machine 900.

The injection molding machine 900 differs from the injection molding machine 100 in the configuration of a power feeding apparatus. A power feeding apparatus 901 of the injection molding machine 900 includes the servo amplifiers A1 to A4 in the power feeding apparatus 4. That is, in the injection molding machine 100, servomotors and servo amplifiers are provided in the injection apparatus 1 and the mold clamping apparatus 2, while in the injection molding machine 900, servomotors are provided in the injection apparatus 1 and the mold clamping apparatus 2, and servo amplifiers are provided in the power feeding apparatus.

Specifically, in the power feeding apparatus 901, DC voltages output from the converter 4A are supplied to the servo amplifiers A1 to A4 through the DC power supply line SL. Further, the converter 4A is connected to each of the servo amplifiers A1 to A4 by the communication line CL.

The DC voltages supplied to the servo amplifiers A1 to A4 are converted into three-phase AC voltages and amplified, and then output to the servomotors M1 and M2 of the injection apparatus 1 and the servomotors M3 and M4 of the mold clamping apparatus 2 through the respective three-phase AC power supply lines SL1 to SL4.

In the injection molding machine 900, the power feeding apparatus 901 is connected to the movable side member, that is, the injection apparatus 1 and the mold clamping apparatus 2, by the three-phase AC power supply lines SL1 to SL4 and the communication lines CL1 to CL4. As a result, the number of power supply lines and communication lines is increased as compared with that in the case of the injection molding machine 100. Thus, noises radiated from the three-phase AC power supply lines SL1 to SL4 increase. Therefore, in order to reduce the effect of the noises, a mechanism such as a shield is provided.

On the other hand, in the injection molding machine 100 according to the first embodiment, the servo amplifier is provided so as to be close to the servomotor instead of being provided in the power feeding apparatus. Therefore, the length of the three-phase AC power supply line connecting the servo amplifier to the servomotor can be greatly reduced as compared with that in the case of the general injection molding machine in which the servo amplifier is provided in the power feeding apparatus located inside the bed or at a position close to the power feeding apparatus. Thus, it is possible to greatly reduce radiation noises from the three-phase AC power supply line connecting the servo amplifier to the servomotor.

Further, in the present configuration, the length of the three-phase AC power supply line connecting the servo amplifier to the servomotor is reduced by supplying DC power in a relatively long path between the servo amplifier and the power feeding apparatus. By this configuration, since the impedance between the servo amplifier and the servomotor can also be reduced, a voltage reduction occurring between the servo amplifier and the servomotor can be suitably prevented. In addition, since the loss between the servo amplifier and the servomotor can be reduced, the power loss between the servo amplifier and the servomotor can be reduced.

Moreover, since the length of the communication line connecting the servo amplifier to the servomotor can be greatly reduced, the noise resistance of the communication line can be greatly improved.

Further, the size of the power feeding apparatus can be reduced by providing the servo amplifier, which is provided inside the bed in the case of the general injection molding machine, on the side of the injection apparatus and the mold clamping apparatus. Thus, a space inside the bed can be secured and the degree of freedom of a layout of equipment inside the bed can be improved.

Servo amplifiers are generally equipped with power semiconductors, and the effects of heat generation by these elements have to be considered. When a servo amplifier is provided inside a bed like the general injection molding machine, for example, a mechanism for performing cooling with a blower fan by attaching a heat sink or the like to a heating element has to be provided. On the other hand, in the present configuration, since the servo amplifier that generates relatively large heat can be installed outside the bed, it is not necessary to provide the aforementioned cooling mechanism, which is advantageous as it enables the size of the bed and the cooling mechanism to be reduced.

In the present configuration, the servo amplifiers are disposed in the injection apparatus 1 or the mold clamping apparatus 2 in a distributed manner, and heat is dissipated through respective housings of the injection apparatus 1 and the mold clamping apparatus 2. Therefore, the heat dissipation design for each servo amplifier can be simplified. Specifically, the servo amplifier can be cooled by providing a heat dissipation fin or a blower fan in the housings of the injection apparatus 1 and the mold clamping apparatus 2. Further, when a cooling mechanism for the servomotor or the like has been originally provided, the servo amplifier can be cooled together with the servomotor or the like, to thereby cool the servo amplifier without having to provide a new cooling mechanism.

In the present configuration, the wires connecting each motor unit provided in the movable side member 5 composed of the injection apparatus 1 and the mold clamping apparatus 2 to the power feeding apparatus, that is, at least three wires of the DC power supply line SL and the communication line CL, are exposed wires, and a force is applied to these wires in accordance with movement of the movable side member 5. As a result, breaks may occur in the DC power supply line SL and the communication line CL. However, in the general injection molding machine, each motor provided in the movable side member 5 is connected to the power feeding apparatus by at least four wires of the communication line CL and the three-phase AC power supply line. Therefore, according to the present configuration, the number of wires between the movable side member 5 and the power feeding apparatus can be greatly reduced, for example, to ¼ of the number of wires in the case of the general injection molding machine, and thus the risk of occurrence of breaks can be effectively reduced.

Further, since the servo amplifier and the servomotor are mounted on the same movable side member 5, no force is applied to the three-phase AC power supply lines even when the movable side member 5 is moved. Thus, breaks can be suitably prevented from occurring in the three-phase AC power supply lines SL1 to SL4 having a larger number of wires than that of the DC power supply line SL.

In the present configuration, when a break has occurred in a wiring W, operations performed by all of the four motor units are affected. Therefore, it is possible to easily determine whether the failure has been caused by the motor units or by a break occurring in the wiring W.

Second Embodiment

An injection molding machine 200 according to a second embodiment will be described. The injection molding machine 100 has been described as being configured so that each motor unit includes a servomotor and a servo amplifier. On the other hand, the injection molding machine 200 is configured so that a capacitor is added to the preceding stage of the servo amplifier.

Figure 7:
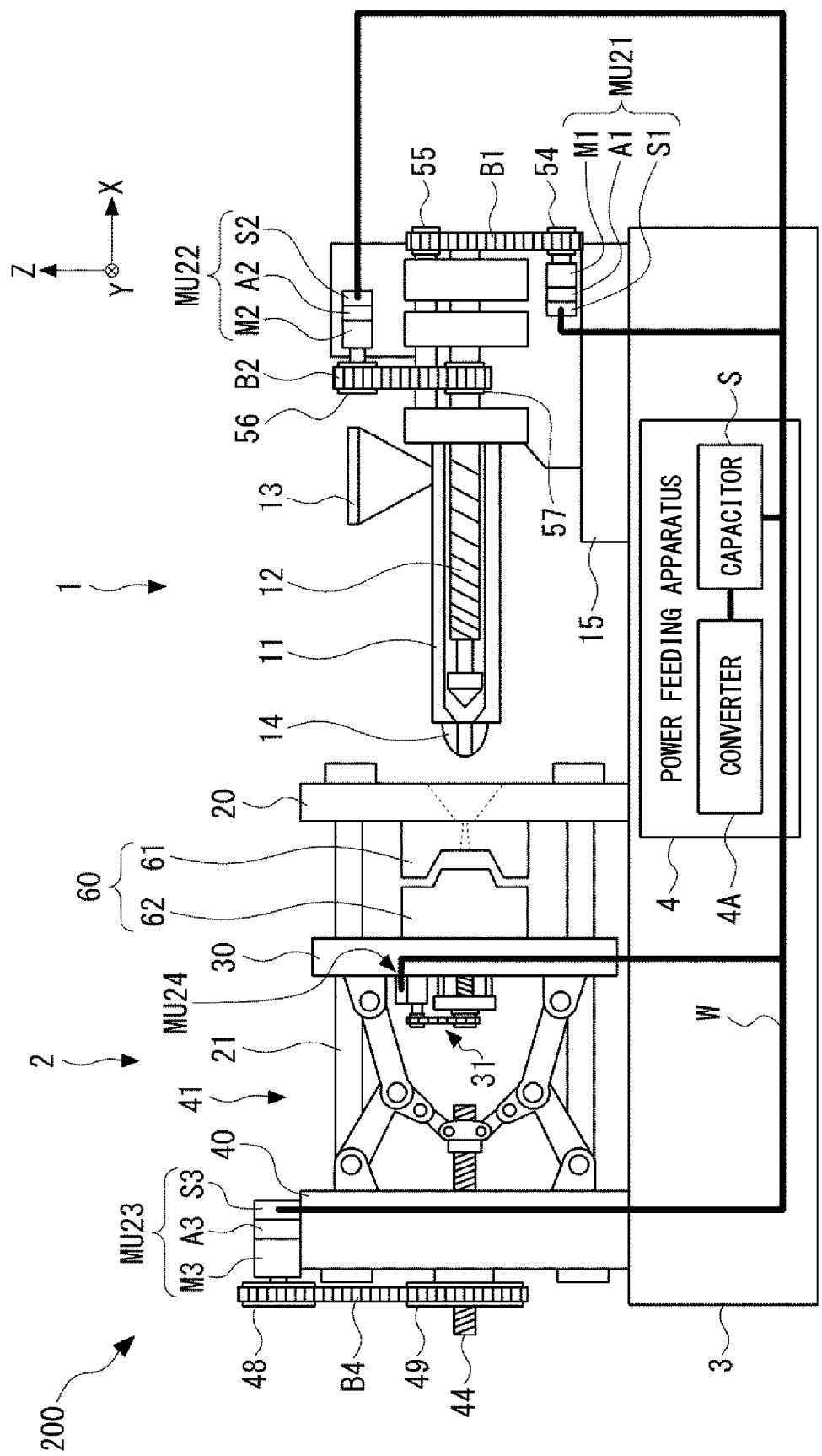
FIG. 7 is a side view schematically showing a configuration of an injection molding machine according to a second embodiment.

FIG. 7 is a side view schematically showing a configuration of the injection molding machine according the second embodiment. The injection molding machine 200 includes an injection motor unit MU21, a plasticization motor unit MU22, a mold clamping motor unit MU23, an ejector motor unit MU24, and the power feeding apparatus 4, which are different in configuration from those of the injection molding machine 100. That is, the injection molding machine 200 has a configuration in which the injection motor unit MU11, the plasticization motor unit MU12, the mold clamping motor unit MU13, the ejector motor unit MU14, and the power feeding apparatus 4 of the injection molding machine 100 are replaced with the injection motor unit MU21, the plasticization motor unit MU22, the mold clamping motor unit MU23, and the ejector motor unit MU24, respectively. Note that the configurations of the injection molding machine 200 other than the above ones are similar to those of the injection molding machine 100.

In contrast to the injection motor unit MU11, the injection motor unit MU21 is additionally provided with a capacitor S1 for preventing the fluctuations in a DC voltage due to the load fluctuation of the servomotor M1, which capacitor is connected between two DC power supply lines for supplying a DC voltage to the servo amplifier A1.

In contrast to the plasticization motor unit MU12, the plasticization motor unit MU22 is additionally provided with a capacitor S2 for preventing the fluctuations in a DC voltage due to the load fluctuation of the servomotor M2, which capacitor is connected between two DC power supply lines for supplying a DC voltage to the servo amplifier A2.

In contrast to the mold clamping motor unit MU13, the mold clamping motor unit MU23 is additionally provided with a capacitor S3 for preventing the fluctuations in a DC voltage due to the load fluctuation of the servomotor M3, which capacitor is provided between two DC power supply lines for supplying a DC voltage to the servo amplifier A3.

Figure 8:
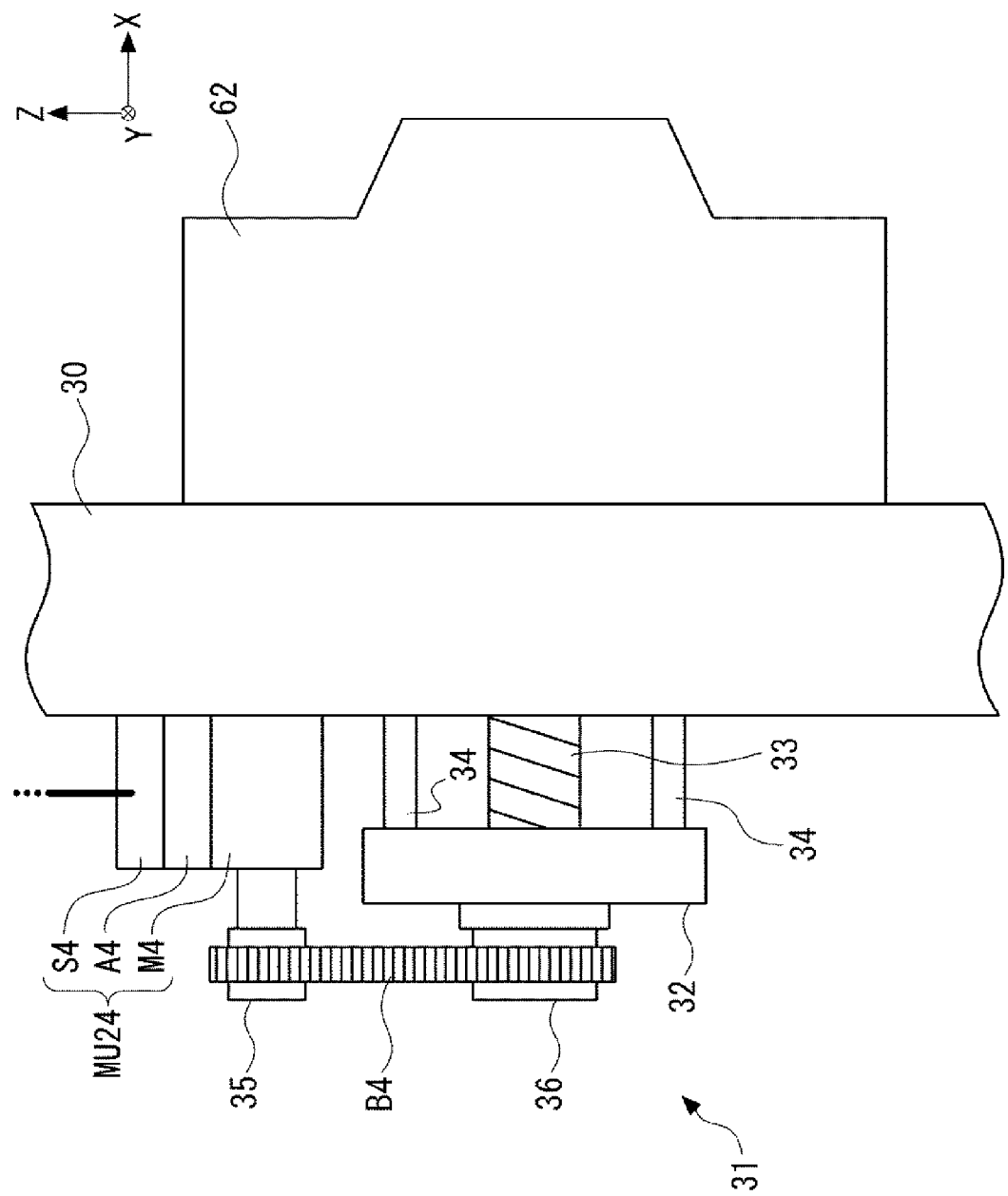
FIG. 8 is a diagram schematically showing a configuration of an ejector mechanism according to the second embodiment.
Figure 9:
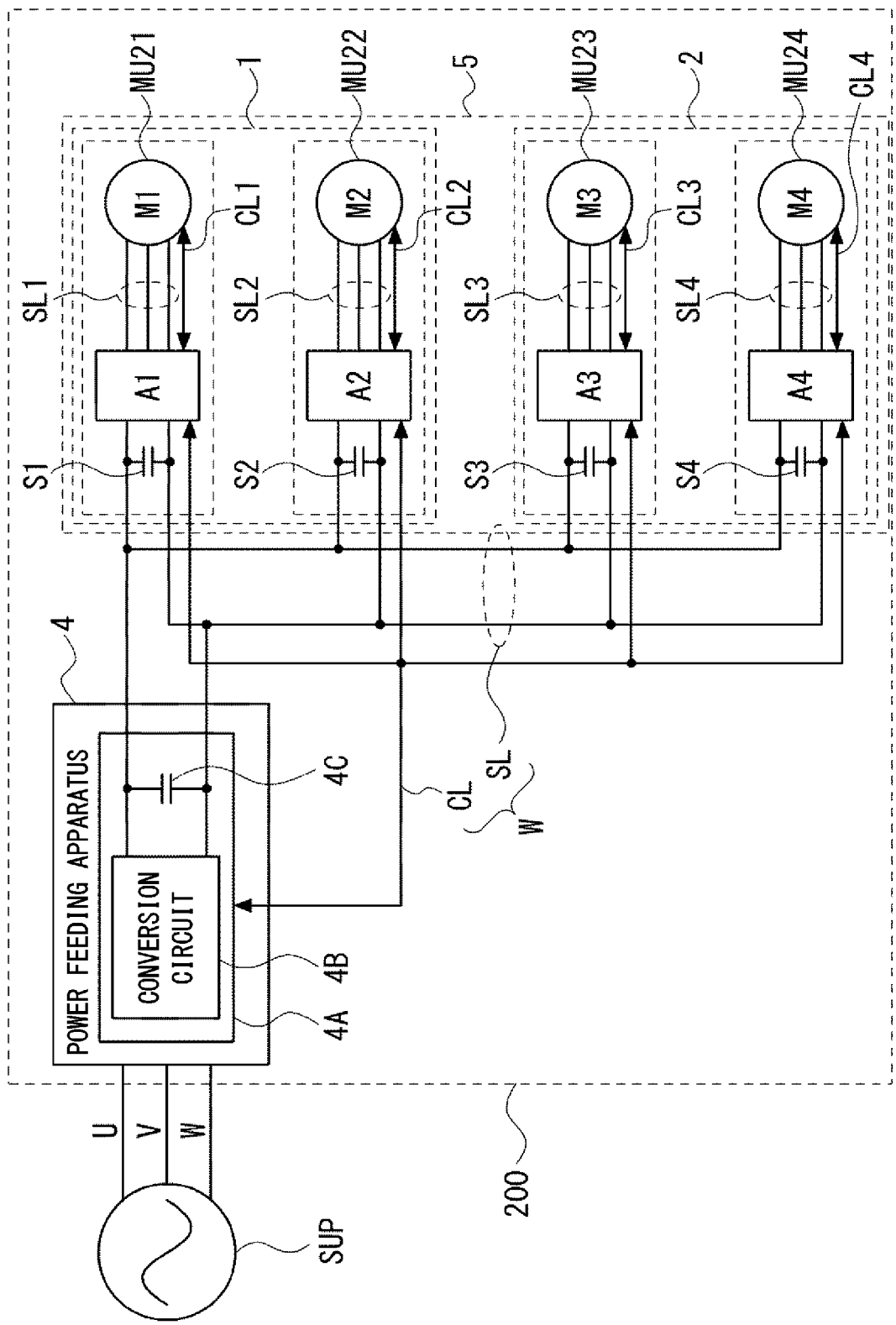
FIG. 9 is a diagram showing a power supply system of the injection molding machine according to the second embodiment.

FIG. 8 schematically shows a configuration of the ejector mechanism 31 according to the second embodiment. In contrast to the ejector motor unit MU14, the ejector motor unit MU24 is additionally provided with a capacitor S4 for preventing the fluctuations in a DC voltage due to the load fluctuation of the servomotor M4, which capacitor is provided between two DC power supply lines for supplying a DC voltage to the servo amplifier A4.

In this example, the capacitors S1 to S4 are configured as capacitors that are connected between two DC power supply lines connected to the servo amplifiers A1 to A4.

As described above, in the present configuration, by connecting the capacitor between two DC power supply lines for supplying the DC voltage to each servo amplifier, it is possible to prevent the fluctuations in the DC voltage. Therefore, it is possible to control the driving of the motor with higher accuracy.

It is needless to say that the capacitors provided in the respective servo amplifiers can prevent not only the fluctuations in the DC voltage due to the load fluctuation of the servomotor but also the fluctuations in the DC voltage due to the effects of, for example, the fluctuations in the three-phase AC voltage and the conversion operation performed by the converter 4A.

Third Embodiment

An injection molding machine 300 according to a third embodiment will be described. In the above-described embodiments, a so-called electrically operated injection molding machine has been described in which an injection mechanism is driven by a motor. However, an injection molding machine in which an injection mechanism is driven by hydraulic pressure may also be used (e.g., Japanese Unexamined Patent Application Publication No. 2007-216285).

Figure 10:
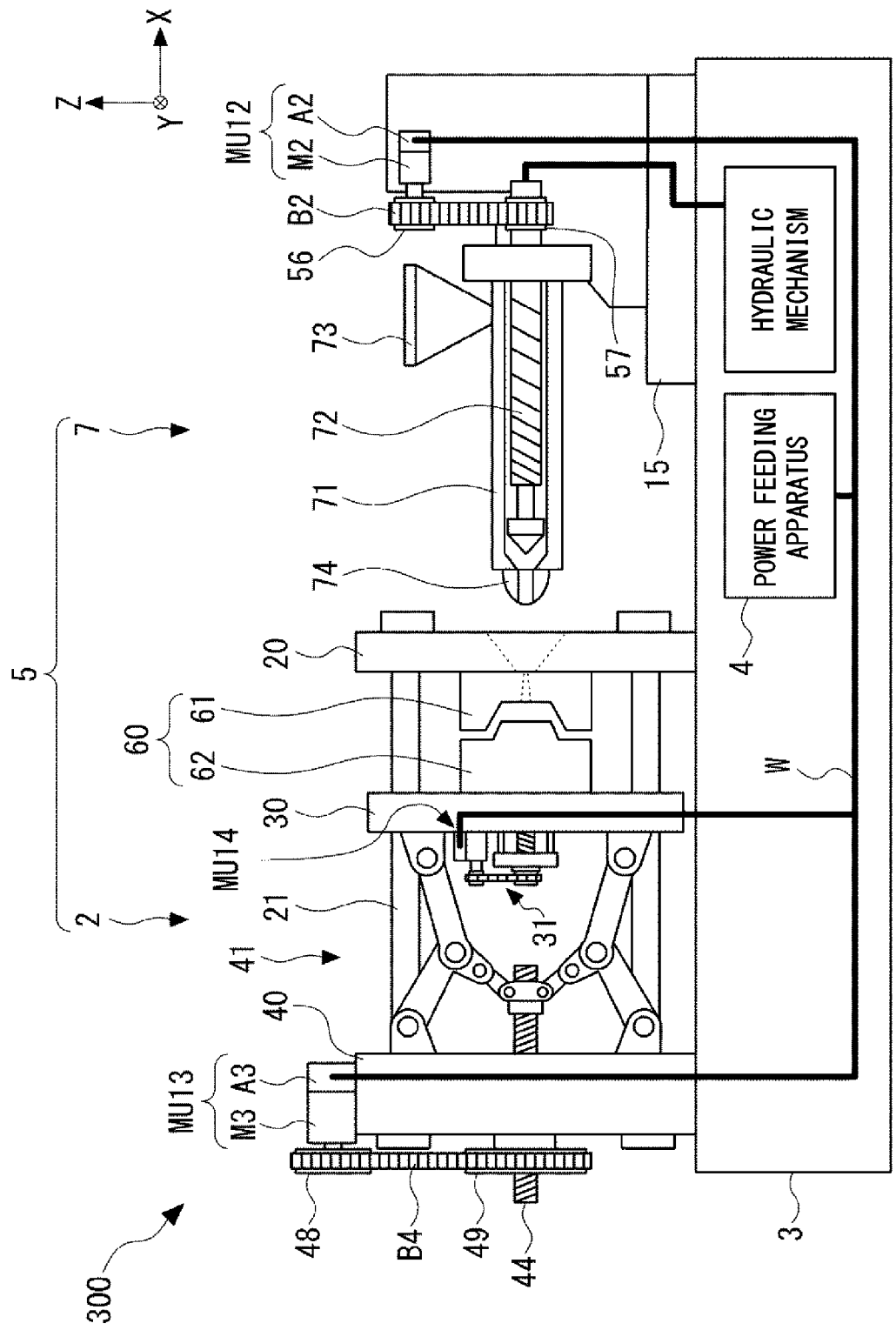
FIG. 10 is a side view schematically showing a configuration of an injection molding machine according to a third embodiment.

FIG. 10 schematically shows a configuration of the injection molding machine according to the third embodiment. The injection molding machine 300 has a configuration in which the injection apparatus 1 of the injection molding machine 100 is replaced with an injection apparatus 7. The injection apparatus 7 is configured so as to drive the injection mechanism, that is, the screw 12 in the axial direction, by hydraulic pressure instead of by a motor. Therefore, the injection molding machine 300 has a configuration in which the servomotor M1 and the servo amplifier A2 are removed from the injection molding machine 100 and a hydraulic mechanism 8 is added. In this example, although the hydraulic mechanism 8 is provided inside the bed 3, a position of the hydraulic mechanism is not limited thereto.

Figure 11:
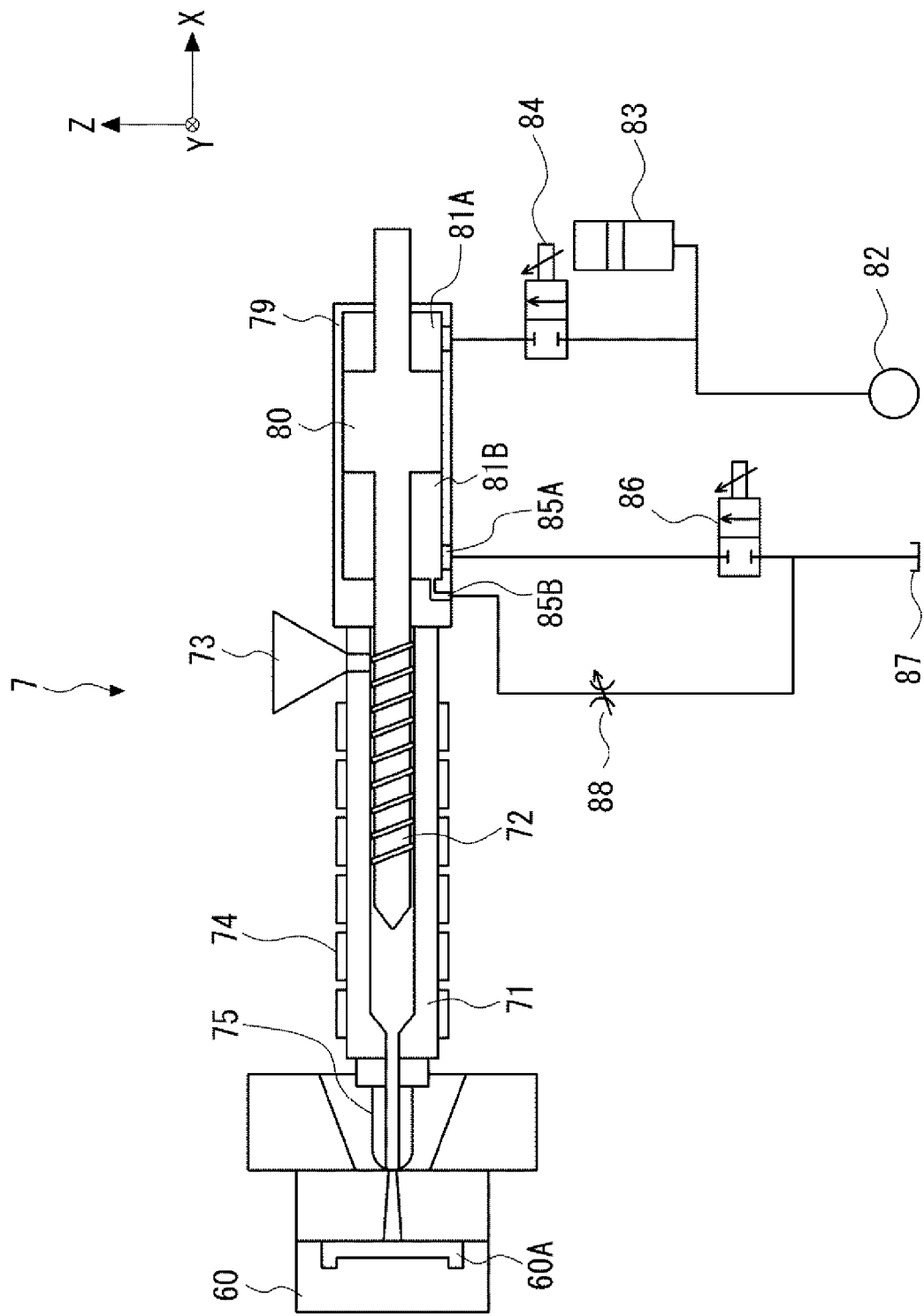
FIG. 11 is a diagram showing a schematic configuration of an injection apparatus 7 according to the third embodiment.

FIG. 11 shows a schematic configuration of the injection apparatus 7 according to the third embodiment. The injection apparatus 7 includes a heating barrel 71, and a screw 72 disposed in the heating barrel 71 to be freely driven in an axial direction and a rotational direction. Molding material is charged from a hopper 73 into the heating barrel 71, and the charged material is molten by frictional heat, shear heat generated due to rotation of the screw 72, and heat applied from a heater 74 disposed on the outer periphery of the heating barrel 71. The molten material is kneaded by the rotation of the screw 72 and sent to the front of the heating barrel 71. A nozzle 75 is attached to a tip of the heating barrel 71. When the material is injected, the molten molding material held at the tip of the heating barrel 71 is injected through the nozzle 75 into a cavity 60A of the mold 60 that is closed.

The screw 72 is rotationally driven by the servomotor M2 and axially driven by an injection piston 80 disposed in an injection hydraulic cylinder 79.

The injection hydraulic cylinder 79 is partitioned into two chambers by the injection piston 80, a front chamber 81B is disposed in a front part (−X side), and a rear chamber 81A is disposed in a rear part (+X side). The pressure oil accumulated in an accumulator 83 is supplied to the rear chamber 81A through a flow control valve 84 by a hydraulic pump 82. In the front chamber 81B, a first oil discharge port 85A that is completely or mostly blocked by the injection piston 80 at a desired pressure-holding switching position of the injection piston 80, and a second oil discharge port 85B that is not blocked by the injection piston 80 even at the most forward position of the injection piston 80. The first oil discharge port 85A is formed in a side face part of the injection hydraulic cylinder 79, and the second oil discharge port 85B is formed in the end face part of the injection hydraulic cylinder 79.

The first oil discharge port 85A is connected to an oil tank 87 through a flow control valve 86, and has an opening area large enough to discharge the hydraulic oil stored in the front chamber 81B to the oil tank 87 in an injection process. The second oil discharge port 85B is connected to the oil tank 87 through a flow control valve 88, and discharges the hydraulic oil in the front chamber 81B to the oil tank 87 in a pressure-holding process. As long as the hydraulic oil can be flowed at a flow rate in the pressure-holding process and at a flow rate for retreating the injection piston 80 (+X direction) in a measuring process through the second oil discharge port 85B, an opening area of the second oil discharge port 85B may be smaller than that of the first oil discharge port 85A.

Injection molding mainly includes the measuring process, the injection process, and the pressure-holding process. In the metering process, solid molding material is fed into the heating barrel 71 from the hopper 73, and the screw 72 is driven rearward in the axial direction (+X direction) by the injection hydraulic cylinder 79 while being rotationally driven by the servomotor M2. Thus, the material is sent to the front (−X direction) of the heating barrel 71 inside the heating barrel 71. In the injection process, when a measured value reaches a predetermined value, the screw 72 is driven forward (−X direction) in the axial direction by supplying the pressure oil to the injection hydraulic cylinder 79, and the measured molten material is injected from the nozzle 75 into the cavity 60A of the mold 60. The pressure-holding process is a process of applying pressure to the material in the mold 60 through the material remaining in the heating barrel 71 to compensate for shrinkage caused by cooling of the material after the injection of the material has been finished. By performing these processes, the material can be molded into a desired shape of the cavity 60A.

As described above, since the injection molding machine 300, which is a hydraulically operated injection molding machine, does not include motors and servo amplifiers for injection, some or all of the servo amplifiers A2 to A4 that drive motors other than the motors for injection are provided in the movable side member.

The configurations of the injection molding machine 300 other than the above ones are similar to those of the injection molding machine 100, and thus redundant descriptions thereof will be omitted.

As described above, according to the present configuration, it can be understood that an effect similar to that achieved in the case of the injection molding machine 100 according to the first embodiment can also be achieved in the case of the hydraulic injection molding machine 300 by providing at least some or all of the servo amplifiers in the movable side member.

Fourth Embodiment

An injection molding machine according to a fourth embodiment will be described. In the above-described embodiments, the injection apparatus has been described as being a single apparatus in which components are integrally configured. However, it is conceivable that the injection apparatus may be physically separated into parts thereof on the injection apparatus side and parts thereof on the mold clamping apparatus side. In this case, since the injection molding machine can be configured by combining the parts thereof on the injection apparatus side and the parts thereof on the mold clamping apparatus side selected in accordance with the application, it can be expected that the flexibility of the configuration of the injection molding machine will be improved.

Figure 12:
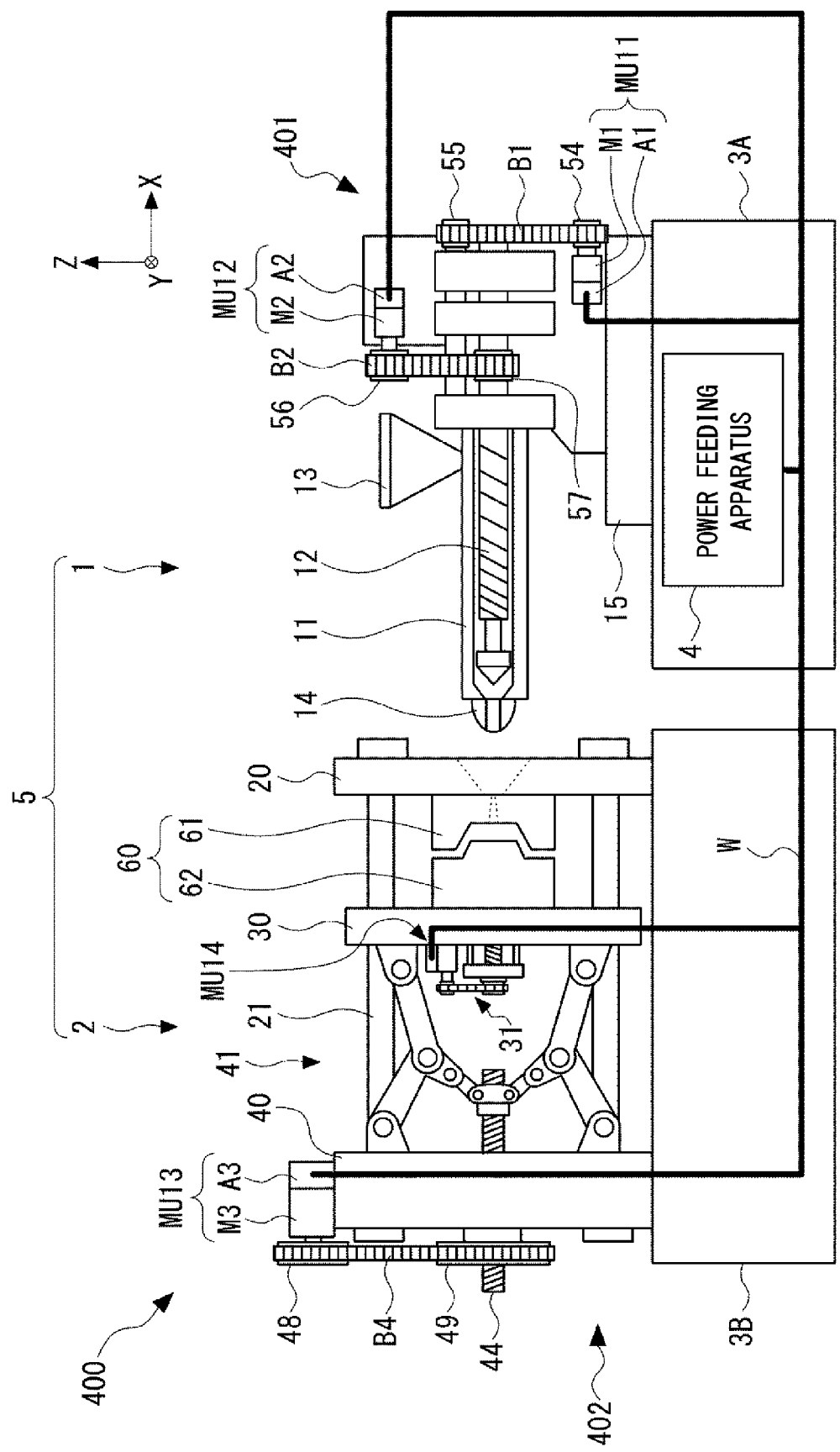
FIG. 12 is a side view schematically showing a configuration of an injection molding machine according to a fourth embodiment.

FIG. 12 is a side view schematically showing the configuration of the injection molding machine according to the fourth embodiment. An injection molding machine 400 has a configuration in which the bed 3 of the injection molding machine 100 is physically separated into a bed 3A located on the side of the injection apparatus 1 and a bed 3B located on the side of the mold clamping apparatus 2. The injection apparatus 1 (also referred to as a first movable side member) is fixed to the bed 3A (also referred to as a first fixed side member). The mold clamping apparatus 2 (also referred to as a second movable side member) is fixed to the bed 3B (also referred to as a second fixed side member).

In the example of FIG. 12, the power feeding apparatus 4 is provided in the bed 3A. Note that the position where the power feeding apparatus 4 is provided is merely an example, and the power feeding apparatus 4 may instead be provided in the bed 3B.

As described above, according to the present configuration, the injection molding machine 400 is configured by combining parts 401 of the injection molding machine 400 on the injection apparatus side and parts 402 of the injection molding machine 400 on the mold clamping apparatus side. Thus, it is possible to improve the flexibility of the configuration of the injection molding machine.

Although, in the example of FIG. 12, the power feeding apparatus 4 is to be provided in either the bed 3A or the bed 3B, the position where the power feeding apparatus is provided is not limited thereto. For example, one power feeding apparatus may be respectively disposed in each of the beds 3A and 3B so that they are separated from each other.

Figure 13:
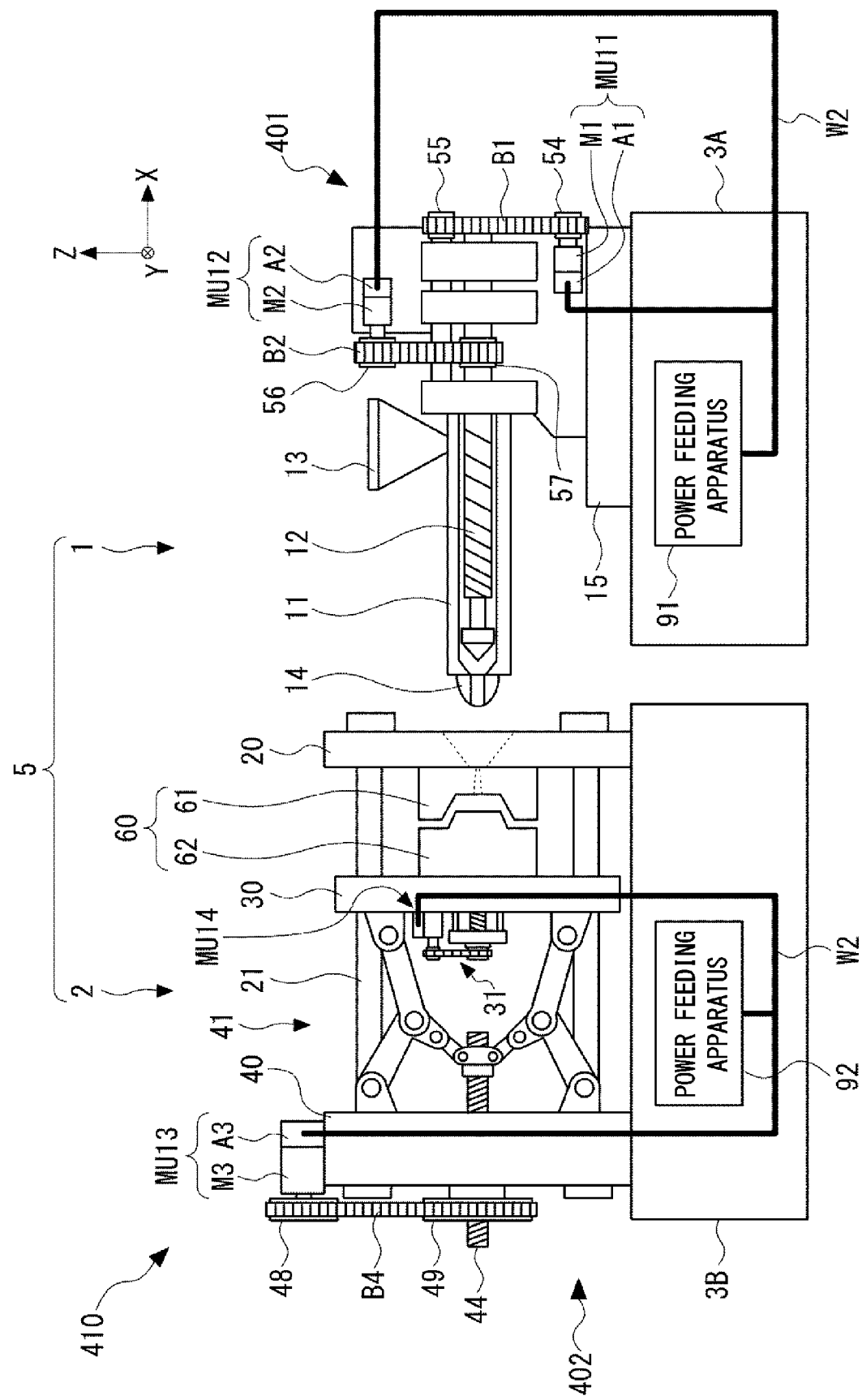
FIG. 13 is a diagram schematically showing a configuration of an injection molding machine in which one power feeding apparatus is respectively disposed in each of two beds so that they are separated from each other.

FIG. 13 schematically shows a configuration of an injection molding machine 410 in which one power feeding apparatus is respectively disposed in each of the beds 3A and 3B so that they are separated from each other. In the injection molding machine 410, regarding the power feeding apparatus 4, a power feeding apparatus 91 that supplies a DC voltage to the injection apparatus 1 through a wiring W1 is provided in the bed 3A, and a power feeding apparatus 92 that supplies a DC voltage to the mold clamping apparatus 2 through a wiring W2 is provided in the bed 3B. Since the configurations of the injection molding machine 410 other than the above ones are similar to those of the injection molding machine 400, and thus redundant descriptions thereof will be omitted.

According to the present configuration, by respectively disposing one of the power feeding apparatuses in each of the beds 3A and 3B, that is, on the side of the injection apparatus 1 and on the side of mold clamping apparatus 2, so that they are separated from each other, it is possible to provide power feeding apparatuses that meet the respective requirements of the side of the injection apparatus 1 and the side of mold clamping apparatus 2. Thus, even when one of the power feeding apparatus on the side of the injection apparatus 1 and the power feeding apparatus on the side of the mold clamping apparatus 2 is to be replaced, only this power feeding apparatus to be replaced needs to be changed, which is advantageous in that both of the power feeding apparatuses do not need to be changed.

Figure 14:
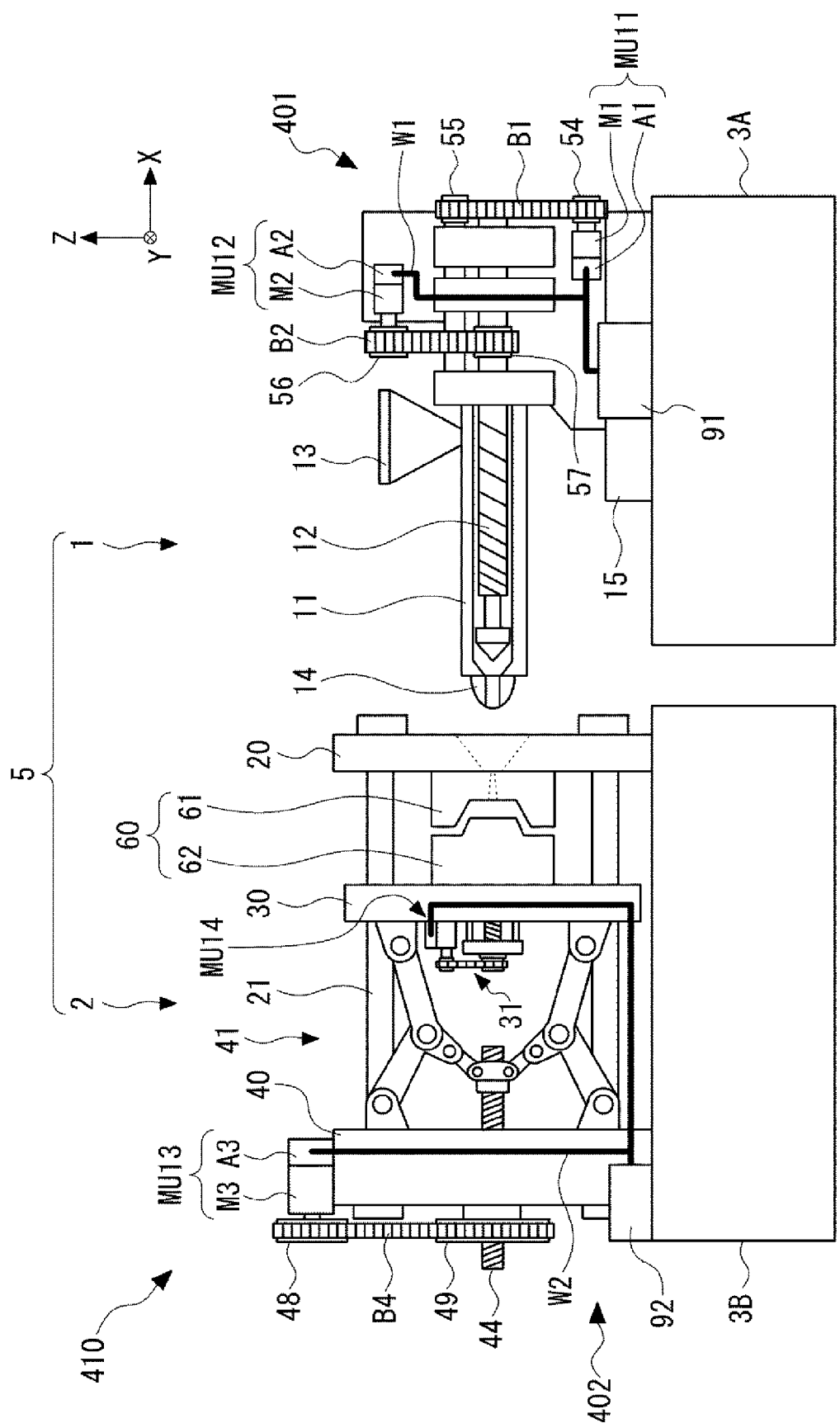
FIG. 14 is a diagram schematically showing a configuration of an injection molding machine in which two power feeding apparatuses are disposed in a movable side member.

Further, the power feeding apparatuses 91 and 92 may be disposed in the movable side member over the bed instead of being disposed inside the bed. FIG. 14 schematically shows a configuration of an injection molding machine 420 in which two power feeding apparatuses are disposed in the movable side member. In the injection molding machine 420, the power feeding apparatus 91 is provided in the injection apparatus 1 and the power feeding apparatus 92 is provided in the mold clamping apparatus 2. Since the configurations of the injection molding machine 420 other than the above ones are similar to those of the injection molding machine 410, and thus redundant descriptions thereof will be omitted.

According to the present configuration, by disposing the power feeding apparatus 91 in the injection apparatus 1 and the power feeding apparatus 92 in the mold clamping apparatus 2 so that they are separated from each other, it is possible to provide the power feeding apparatuses that meet the respective requirements of the side of the injection apparatus 1 and the side of mold clamping apparatus 2 like in the case of the injection molding machine 410. Thus, even when one of the power feeding apparatus on the side of the injection apparatus 1 and the power feeding apparatus on the side of the mold clamping apparatus 2 is to be replaced, only this power feeding apparatus to be replaced needs to be changed, which is advantageous in that both of the power feeding apparatuses do not need to be changed.

Other Embodiments

The present disclosure is not limited to the above-described embodiments, and can be appropriately changed without departing from the scope of the present disclosure. For example, in the above embodiments, although a case has been described in which a converter circuit and a capacitor are provided in the converter of the power feeding apparatus, this is merely an example. Other circuits or components, such as a chopper circuit, that are capable of controlling an output current and an output voltage may be provided in the converter as appropriate in addition to the conversion circuit and the capacitor.

In the above-described embodiments, although the servomotors M1, M2, M3, and M4 transmit driving forces through the respective belts B1 to B4, this is merely an example, and various types of driving force transmitting means such as a gear mechanism may be used.

In the injection molding machine according to the third embodiment, like in the case of the injection apparatus according to the second embodiment, a capacitor may be connected between two DC power supply lines for supplying DC power to the servo amplifier.

Regarding the injection molding machine according to the fourth embodiment, an example has been described in which the injection molding machine according to the first embodiment is separated into parts thereof on the injection apparatus side and parts thereof on the mold clamping apparatus side; however, it is needless to say that the injection molding machine according to the second and the third embodiments may be separated into parts thereof on the injection apparatus side and parts thereof on the mold clamping apparatus side.

In the above-described embodiments, although the servo amplifiers corresponding to the respective servomotors that are provided in the movable side member are provided in the movable side member, this is merely an example. As necessary, servo amplifiers corresponding to some of the servomotors may be provided in the movable side member, while servo amplifiers corresponding to the rest of the servomotors may be provided in the fixed side member.

In the above-described embodiments, although the capacitors corresponding to the respective servo amplifiers that are provided in the movable side member are provided in the movable side member, this is merely an example. As necessary, capacitors corresponding to some of the servo amplifiers may be provided in the movable side member, and capacitors corresponding to the rest of the servo amplifiers may be provided in the fixed side member.

The above-described motor unit may be configured as a physically indivisible unit in which the servomotor and the servo amplifier are integrally configured. Further, the above-described motor unit may be configured as a physically indivisible unit in which the servomotor, the servo amplifier, and the capacitor are integrally configured.

In the above embodiments, a case in which the servomotor is disposed together with the servo amplifier so that they compose a motor unit has been described; however, the servomotor and the servo amplifier may be disposed in a distributed manner as necessary. Further, in the above embodiments, a case in which the servomotor is disposed together with the servo amplifier and the capacitor so that they compose a motor unit has been described; however, some or all of the servomotors, the servo amplifiers, and the capacitors may be disposed in a distributed manner as necessary.

In the above-described embodiments, an example in which resin is used as the material to be injected has been described, and, however, this is merely an example. It should be appreciated that the configuration according to the above-described embodiments may be applied to an injection molding machine for injecting other materials such as metal.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An injection molding machine comprising:
a fixed side member; and
a movable side member fixed to the fixed side member, the movable side member being driven by a motor in order to perform injection molding of a molded product,
the movable side member including:
a mold clamping apparatus configured to clamp a mold; and
an injection apparatus configured to inject a material for the molded product into the mold,
the injection molding machine further comprising:
a power feeding apparatus provided inside the fixed side member and configured to convert a three-phase AC voltage into a DC voltage;
a first motor unit mounted on the injection apparatus, the first motor unit including a first motor and a first servo amplifier;
a second motor unit mounted on the mold clamping apparatus, the second motor unit including a second motor and a second servo amplifier;
wherein
the power feeding apparatus is connected to each of the first and second servo amplifiers by a DC power supply line in order to supply the DC voltage to the first and second servo amplifiers,
the power feeding apparatus is connected to each of the first and second servo amplifiers by a communication line in order to exchange control signals with the first and second servo amplifiers, the control signals controlling operations of the injection molding machine,
the first servo amplifier converts the DC voltage received from the power feeding apparatus into an AC voltage and supplies the AC voltage to the first motor via a first power supply line,
the second servo amplifier converts the DC voltage received from the power feeding apparatus into an AC voltage and supplies the AC voltage to the second motor via a second power supply line,
the first servo amplifier transmits a first control signal received from the power feeding apparatus to the first motor via a first communication line, and
the second servo amplifier transmits a second control signal received from the power feeding apparatus to the second motor via a second communication line,
wherein exchange of control signals between the power feeding apparatus and the first and second motors being through the first and second servo amplifiers, respectively.

2. The injection molding machine according to claim 1, further comprising capacitors connected to the DC power supply line, the capacitors being provided in the movable side member so that they correspond to the first and second servo amplifiers.

3. The injection molding machine according claim 2, wherein
the DC power supply line includes two power supply lines, and
the capacitor is connected between the two power supply lines.

4. The injection molding machine according to claim 3, wherein at least one of the integral motor units includes a capacitor.

5. The injection molding machine according to claim 1, wherein at least one of the first and second motor units is configured as an integral motor unit.

6. The injection molding machine according to claim 1, further comprising a third motor unit mounted on the mold clamping apparatus and including a third motor and a third servo amplifier,
wherein
the second motor is a mold clamping motor configured to drive the mold clamping apparatus in order to open and close the mold,
the third motor is an ejector motor configured to drive a member for ejecting the molded product from the mold, and
the first motor is a plasticization motor configured to drive a member for plasticizing a material for injecting the material for the molded product into the mold.

7. The injection molding machine according to claim 6, wherein an injection motor configured to drive a member for injecting the plasticized material for the molded product into the mold is further provided in the injection apparatus.

8. The injection molding machine according to claim 1, wherein
the fixed side member comprises a first fixed side member and a second fixed side member that are physically separated from each other, and the movable side member comprises a first movable side member fixed to the first fixed side member and a second movable side member fixed to the second fixed side member.

9. The injection molding machine according to claim 8, wherein the first movable side member is the injection apparatus and the second movable side member is the mold clamping apparatus.

10. The injection molding machine according to claim 8, wherein the power feeding apparatus is provided in one of the first fixed side member and the second fixed side member.

11. The injection molding machine according to claim 8, wherein the power feeding apparatus comprises a first power feeding apparatus configured to supply the DC voltage to the first movable side member and a second power feeding apparatus configured to supply the DC voltage to the second movable side member, the first power feeding apparatus being provided in the first fixed side member, the second power feeding apparatus being provided in the second fixed side member.

12. The injection molding machine according to claim 8, wherein the power feeding apparatus comprises a first power feeding apparatus configured to supply the DC voltage to the first movable side member and a second power feeding apparatus configured to supply the DC voltage to the second movable side member, the first power feeding apparatus being provided in the first movable side member, the second power feeding apparatus being provided in the second movable side member.

* * * * *